Jan. 13, 1970        R. D. BUCK        3,489,468
SEAL ARRANGEMENT FOR CARRIER ROLLS
Filed Dec. 8, 1967        2 Sheets-Sheet 1
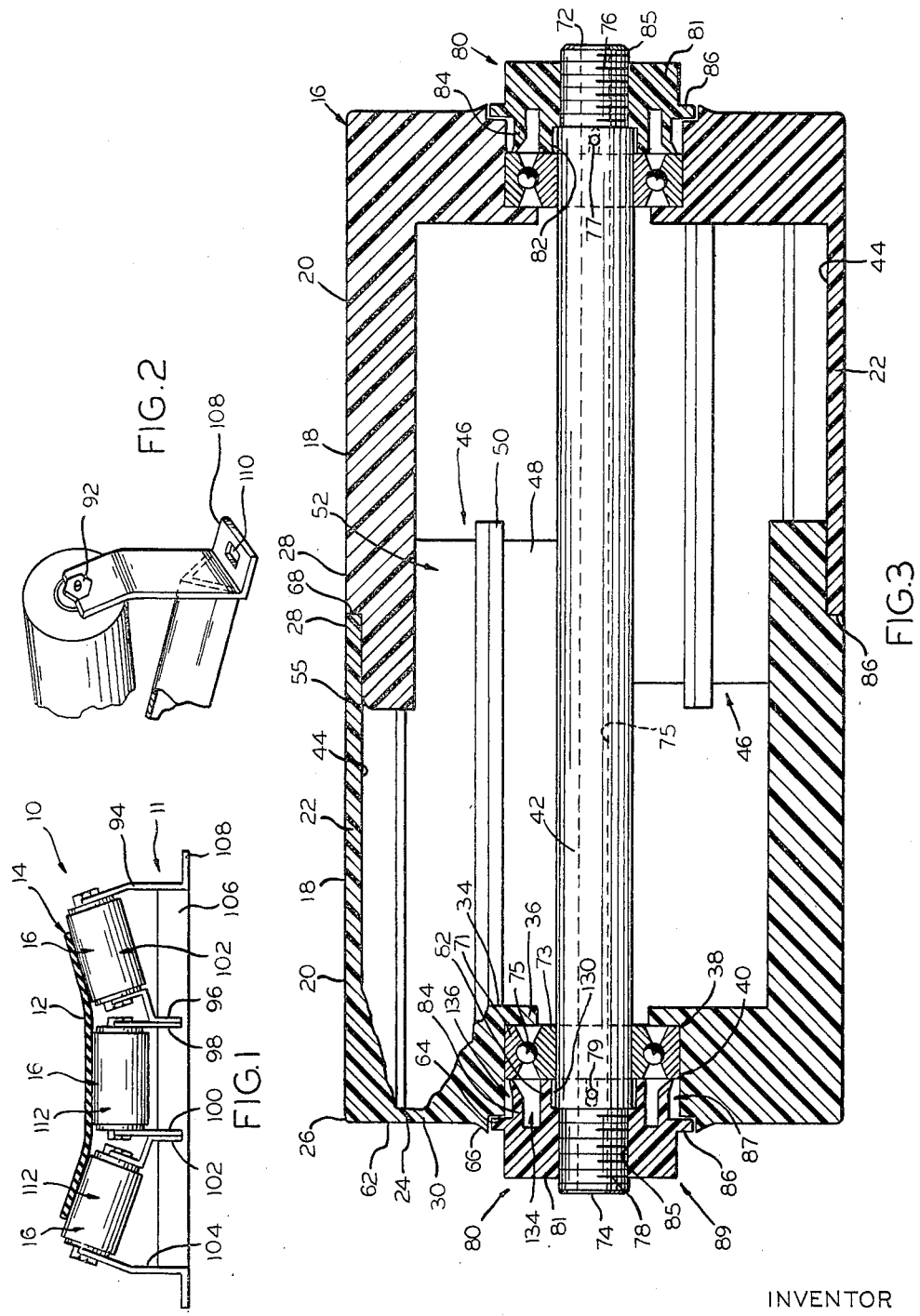
INVENTOR
RICHARD D. BUCK
BY
Mann, Brown & McWilliams
ATTORNEYS

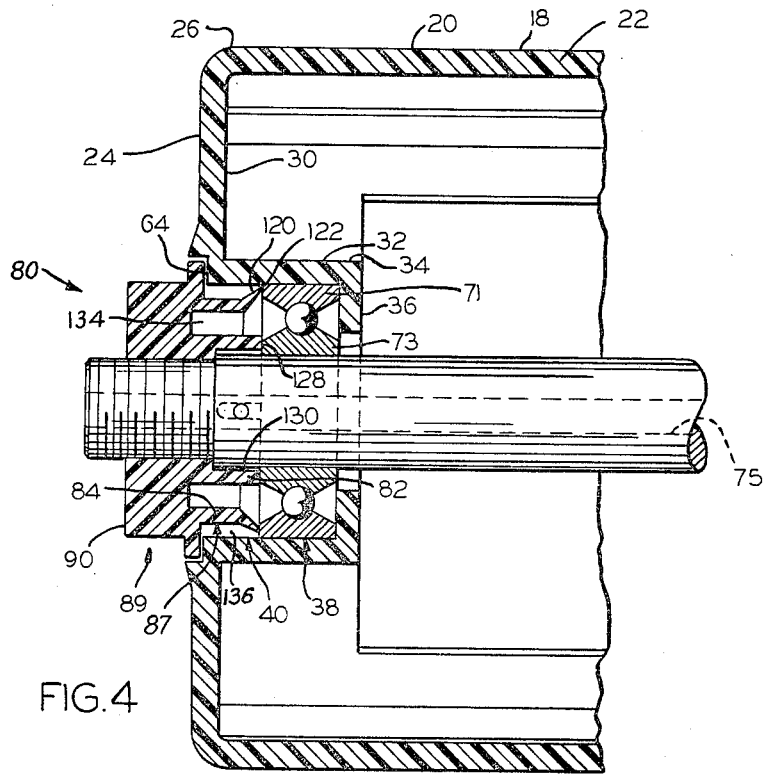
FIG.4
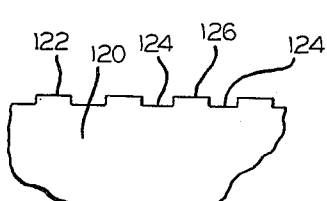
FIG.6
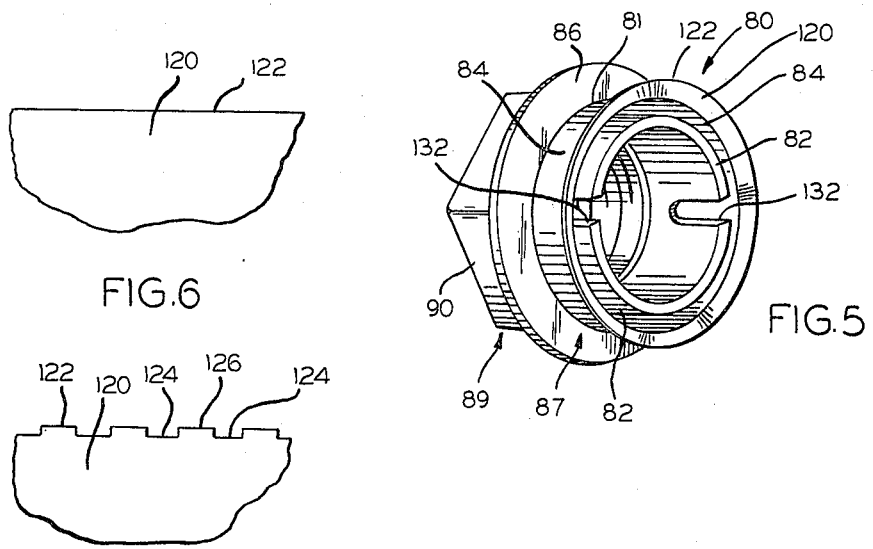
FIG.5
FIG.7
INVENTOR
RICHARD D. BUCK
BY
Mann, Brown & McWilliams
ATTORNEYS

United States Patent Office 3,489,468
Patented Jan. 13, 1970

3,489,468
SEAL ARRANGEMENT FOR CARRIER ROLLS
Richard D. Buck, 645 Seneca Drive, Aurora, Ill. 60506
Filed Dec. 8, 1967, Ser. No. 689,053
Int. Cl. F16c *13/00, 35/00, 33/72*
U.S. Cl. 308—20                                3 Claims

ABSTRACT OF THE DISCLOSURE

The invention relates to a seal for dead shaft mounted conveyor belt carrier rollers journalled by ball bearing units adjacent either end of the roller, and takes the form of a one-piece plastic body in the form of a nut that includes at one end thereof a hex shaped portion for application to a similarly shaped seat in the carrier frame, and at the other end thereof a pair of radially spaced axially extending flanges that are positioned in alignment with the inner and outer races of the respective bearing units. The radially outward flange terminates in a tapered, outwardly flared, lip and the flanges are proportioned axially of the shaft so that when the radially inward flange is positioned to engage the adjacent bearing unit inner race, the lip of the radially outward flange is compressed against the outer race. Interposed between the two end portions of the seal body member is a radial flange that is disposed to serve as a flinger and form a labyrinth seal with respect to the roller end wall when the seals are disposed in said position, in which they are made fast by set screws.

---

This invention relates to a seal for belt conveyor carrier rolls, and more particularly to a combination nut and seal for securing the roll on a dead shaft mounting and serving to shield the roll bearings against foreign matter.

The load carrying runs of bulk carrying material handling belt conveyors are customarily supported between their end pulleys on idler rollers, of which a common design is a tubular steel idler roller journalled on a dead shaft by suitable antifriction bearings. While belt conveyors themselves are adapted to handle a wide variety of bulk materials under adverse conditions for extended periods of time, considerable difficulty has been experienced due to untimely failure of the carrier rolls and especially the bearings therefor, leading to frequent and time consuming, and thus costly shut downs.

While it has long been general practice to provide suitable seals on the dead shaft ends to keep the bearing lubricant in place and prevent access of foreign matter to the bearing, bearing failures still continue to be a problem, especially where the material handling installation will involve a concentrated presence of dust, grit and other foreign matter, which often times is corrosive in nature in addition to effecting an undesirable abrasive action on, and clogging of, the bearing surfaces that prematurely destroys the bearing. Even the so-called "sealed-for-life" bearings have been found to be subject to untimely failure where the installation will involve the presence of significant amounts of micro-dust.

A principal object of this invention is to provide a seal for belt conveyor support rollers which effectively protects the roller bearing even in the presence of significant amounts of corrosive dust.

Another principal object of the invention is to provide a belt conveyor support roll mounting arrangement in which the bearing seals not only protect the bearings but also provide a centering action on the roller with respect to its journalling shaft and serve to properly index and mount the roller on the carrier frame.

Other objects of the invention are to provide a combination nut and seal for carrier rolls that is of one part construction, that is adapted to be formed from relatively inexpensive plastic materials without machining, and that is significantly economical of manufacture, convenient to apply and long lived in use.

Other objects, uses, and advantages will be obvious from a consideration of the following detailed description and the drawings.

In the drawings:

FIGURE 1 is a small scale side elevational view of the carrier frame and roller therefor that includes the seal arrangement of this invention, which view is taken transversely of the usual path of movement of the conveyor belt;

FIGURE 2 is a fragmental perspective view showing one end of the carrier frame and adjacent roller thereof that is shown in FIGURE 1;

FIGURE 3 is an enlarged cross-sectional view taken longitudinally of one of the rollers of FIGURE 1, illustrating some of the specifics of the roller and showing its journalling bearing units and seals in section;

FIGURE 4 is a fragmental view of the left hand end of FIGURE 3 on an enlarged scale and better illustrating the cooperation between the seal, the roller and its bearing unit, and also showing the roller rotated about its axis about 15 degrees from the position of FIGURE 3 to provide a second position showing of the roller ribs;

FIGURE 5 is a perspective view of the seal itself showing its bearing engaging end;

FIGURE 6 is a fragmental large scale plan view of the edge of the sealing lip which engages the bearing unit outer race, illustrating one configuration of the lip edge; and FIGURE 7 is a view similar to that of FIGURE 6 but illustrating a modified form of the sealing lip edge.

However, it is to be understood that the specific drawing illustrations provided are supplied primarily to comply with the requirements of the Patent Code and the invention may have other embodiments which are intended to be covered by the appended claims.

Reference numeral 10 of FIGURES 1 and 2 generally indicates a carrier for the upper run 12 of a belt conveyor 14 which carrier 10 is provided with rolls 16 of the type described in my concurrently filed application Ser. No. 689,080 (now Patent No. 3,416,638, granted Dec. 17, 1968), the entire disclosure of which is hereby incorporated herein by this reference.

The rollers 16 are each equipped with seals 80 arranged in accordance with this invention, and while seals 80 are readily adapted for other applications, the particular roller construction of said application together with the pair of seals 80, roller dead shaft 42, and bearing assemblies 38 provide an important new roller assembly 112 of special characteristics. Consequently, many of the roller specifics described in said application will be referred to herein with the reference numerals employed being the same as those used in said application where like parts are involved.

As disclosed in said application, each roller 16 is made up of a pair of identical half rolls 18 formed from a corrosion resistant plastic, and a preferred material that is well suited for purposes of the roller assembly 112 is the acrylonitrile-butadiene-styrene composition sold by Fiberfil Inc. of Evansville, Ind. under the trademark Absafil. The G–1200/40 grade of this material is preferred, which includes a fiberglass filler of 40 percent in which the fibers are relatively long (on the order of 7/16 of an inch).

Each roller half 18 comprises a one-piece element defining a cylindrical body 20 having an annular side wall 22 and a web 24 formed across one end 26 of a body, with the other end 28 being open in the unassembled state.

The web 24 forms the side wall 30 of the roller and is formed to define an annular sleeve 32 (see FIGURE 4) extending inwardly of the wall 30 toward the roller section end 28, which sleeve 32 is concentrically located with respect to the longitudinal axis of the individual roller sections. The sleeve 32 at its inner end 34 includes a radially extending flange 36 against which is seated in the assembled condition of the roller a rolling bearing in the form of a ball bearing unit 38 that is preferably press fitted into place. The sleeve 36 of each section 18 defines a socket 40 for receiving the ball bearing unit 38 that in the sealed assembled relation of roller assembly 112 is mounted on shaft 42, which extends through the completed roller, and thus between the assembled roller sections 18 in the manner suggested in FIGURE 3.

Each roller section 18 along the inner surface 44 of its side wall 22 is formed with a plurality of special ribs 46 that extend longitudinally of the roller.

The ribs 46 each include a circumferentially extending portion 48 and the radially extending potrion 50, as is best indicated in FIGURE 3. The ribs 46 extend from the roller section end walls 30 to the open ends 28 of the individual sections and project from such open ends 28 to provide outwardly and axially projecting rib segments 52.

Reference may be had to my said application for a more specific description and drawing illustration of the ribs 46, although it is here pointed out that the ribs 46 are spaced equal distantly about the circumference of the respective roller sections 18, and in the specific roller arrangement illustrated they are three in number for each section. The end walls 30 of each roller section on their external surfaces 62 are formed with an annular sealing surface 64 that is encircled by a flared lip or shoulder 66 which cooperates with an adjacent seal 80.

As already indicated, the roll sections 18 are identical and any two of them may be assembled to form a complete roll 16. This is done by applying along the terminal portion 68 of a roller section 28 and along the outwardly facing surfaces of ribs 46, a suitable bonding solvent, such as methyl ethyl ketone, and then inserting the projecting rib segments 52 of the respective roll sections into and within the annular wall 22 of the respective sections to the point that the terminal edges 68 of the respective sections are in contact.

The bonding solvent indicated effects a temporary dissolving of the plastic material of the respective surfaces indicated so that the material of the respective adjacent parts joins together to integrally unite the roller sections, with the rib projections 52 of one section then bearing in reinforcing relation to the annular wall of the other roller section and vice versa.

After the assembly of the individual rollers has been completed, ball bearing units 38 are applied to the individual sockets 40 defined by sleeves 32. Units 38 may be of any suitable type, and as illustrated, each comprises an outer race 71, an inner race 73 and a plurality of bearing balls 74 interposed between the inner and outer races and held in spaced relaiton by the usual spacer device (not shown). The bearing unit itself also preferably includes a suitable seal arrangement, and where the conveyor installation is to involve excessive dust and corrosion conditions, a "sealed-for-life" type bearing unit is preferred.

As already indicated it is preferred that the bearing units 38 be proportioned so that press fitting is required to mount them in their illustrated positions within the respective sockets 40, and this may be done in any suitable manner after the roller sections have been assembled to form the individual rollers 16.

Shafts 42 may then be applied to the roller through the inner races of the respective bearing units 38 thereof, as indicated in FIGURE 3. The shaft 42 preferably has an outer diameter that substantially complements the inner diameter of the inner races 73 and the shaft is formed at either end 72 and 74 thereof with threaded end portions 76 and 78. As indicated in FIGURE 3, the shaft 42 should be proportioned so that its ends 72 and 74 extend somewhat outwardly of the roll end walls 30 in the manner indicated for application thereto of the novel seals 80 that are applied to either end of the shaft. The shaft 42 is formed with a bore 75 extending therethrough and ports 77 and 79 communicating with the bore 75 adjacent the respective threaded end portions 76 and 78, respectively.

The seal 80 of this invention is in the form of a body 81 formed from a suitable lubric plastic material such as Delrin (an acetal resin product made by E. I. du Pont de Nemours & Company) that defines spaced annular flanges 82 and 84 that respectively bear against the bearing unit inner and outer races. The seal body is internally threaded as at 85 to be turned up against the respective ball bearing units in the manner indicated and includes a radial flange portion 86 that in the assembled relation of the assembly 112 is disposed in closely spaced relation to the roller end wall surfaces 64.

It will thus be observed that the seal body 81 defines an end portion 87 on one side of the radial flange 86 that is composed of said annular flanges 82 and 84, and an end portion 89 on the other side of the flange 86 which in the embodiment illustrated is in the form of a hex shaped lug portion 90 that is proportioned to seat in the hex shaped opening 92 of the conventional carrier frame 11 on which the rollers 16 are mounted. Lug portion 90 in practice may be shaped and proportioned to fit into or be otherwise supported by any suitable carrier frame, and thus may be rounded with hex shape defining flats, spherical, or any other shape consistent with the objects of the invention.

As indicated in FIGURES 3, 4 and 5, the annular flange 84 of the seal body 81 at its outwardly projecting end is formed with a tapering outwardly flared lip 120 terminating in an annular edge 122. Edge 122 tapers down to a knife edge configuration, which may be continuous about the circumference of edge 122, as indicated in FIGURE 6, or in an alternate arrangement, may define spaced indentations 124 separating spaced projections 126 which terminate in segments of the edge 122 (see FIGURE 7).

In accordance with this invention, the lengths of the flanges 82 and 84 axially of the body 81 are made such that the flange 82 is slightly shorter than the flange 84. In other words, the proportioning is such that as the individual seals 80 are turned on the respective shaft end portions toward the respective bearing units 38, the end 128 of the annular flange 82 does not engage the adjacent bearing unit inner race until after the edge 122 of annular flange 84 has engaged the bearing unit outer race 71 and has been compressed sufficiently to flare outwardly somewhat to thereby place the lip 120 under compression at least a slight amount, but not sufficient to apply undesirable drag on the rotation of the roller. To achieve this end, the annular flange 82 including its end surface 128 should project short of the plane of the annular edge 122 of flange 84 a small dimension, and in practice a dimension found suitable for this balancing of functions is about .005 inch, where as here, the bearing inner and outer races have the same dimension axially of the shaft. Where the bearing unit inner and outer races are of different dimensions axially of the shaft, the relative lengths of seal flanges 82 and 84 are to be modified proportionately to achieve the same end.

Furthermore, the seal body 81 is proportioned so that when the end surface 128 of flange 82 is turned up against the inner race, the body radial flange 86 is spaced slightly from the roller sealing surface 64 at either end of the roller.

As is indicated in FIGURES 3 and 4, the internal diameter of the annular flange 82 is made somewhat larger than the external diameter of shaft 42 to define an annular lubricant pooling space 130 between the flange 82 and the shaft 42. Flange 82 is formed with one or more axially extending notches 132 (see FIGURE 5) and the parts are preferably proportioned such that when the end surface 128 of the seal engages the adjacent bearing inner race 73, the flange 82 will overlie one of the shaft lubricant ports 77 or 79, depending upon which end of the shaft the seal is applied to.

After the shaft 42 has been applied to the rollers 16 in the manner referred to above, the individual seals 80 are applied to the respective ends 72 and 74 of the shaft in the manner indicated in FIGURES 3 and 4 and are turned up onto the shaft to the point where the end surfaces 128 of the respective seals engage the adjacent inner races of the respective bearing units 38. This places the annular edge 122 of the seal flange 84 in compressed relation with the adjacent outer race of the respective bearing units and tends to flex the lip 120 radially outward under the compressive action involved. The edge 122 thus provides a line contact about the circumference of the outer race 71, which line contact may be reduced even further by employing the embodiment of FIGURE 7.

The roller assembly 112 thus provided is then applied to the carrier frame 11 to form a dead shaft type journalling arrangement for the respective rollers 16. As indicated in FIGURES 1 and 2, the carrier frame 11 is shown in the form of a plurality of support arms 94, 96, 98, 100, 102 and 104 affixed to a suitable bracing member 196 that is in the form of an angle iron, with the carrier frame components being joined together in any suitable manner as by welding. The end support members 84 and 104 are formed with feet 108 to define suitable bolt holes 110 for purposes of mounting the carrier frame in place in the usual manner.

The individual roller assemblies 112 may be applied to any one of the three roller positions shown in FIGURE 1 and interchanged as desired, as all the carrier frame support arms are formed with the identical hex shaped mounting seats 92. The flanges 86 of the seals 80 serve the additional function of properly centering the rollers between the respective pairs of roller support arms as the flange 86 projects radially outwardly of the lug portion 90 and engages behind the respective pairs of supports for each roller 16.

Prior to application of the individual roller assemblies 112 to the carrier frame, the bore 75 of the respective shafts 42 is charged with grease or any other suitable lubricant, which has access to the pooling areas 130 defined by the seals through the respective shaft ports 77 and 79 from which it passes through the seal notches 132 into the annular chamber 134 that is defined by the seal flanges 82 and 84, and which is disposed in circumferential alignment with the space between the inner and outer races of the respective bearing units 38.

The radial flanges 86 of the respective seals define a labyrinth type seal between the roller and the respective seals 80 and along the roller surface 64 and axially of the flared shoulder 66. Keeping in mind that it is the roller 16 and outer race 71 that rotate with respect to the shaft 42, inner race 73, and seal 80, the radial flange 86 thus serves a finger function to keep dust and other foreign matter from entering the roller pockets 40.

Since in the assembled relation of the roller assemblies 112 the lips 120 of the respective seals are under compression that tends to flex them outwardly of the axis of shaft 42, as the edge 122 wears away in use, the lip 122 tends to return to its original shape and thus takes up the slack involved to thereby maintain the contact between the edge 122 and the bearing unit outer races about the circumference of the edge 122.

Alternately, the shaft 42 may be of the solid type and lubricant supplied to the chamber 134 by a suitable grease fitting associated with the respective seal bodies 80.

The flexing of the seal sealing lips 120 on application to the respective roller assemblies 112 in addition to providing the sealing action indicated also centers the roller with respect to the seals 80 while the critical dimension difference between flanges 82 and 84 as to axial length avoids application of undue unbalancing pressures on the ball bearing unit parts that would adversely affect bearing operation and undue drag on the rotation of the roller.

It has been found that the chamber 136 defined by the respective seals 80 and the roller sleeve portions 32 forms a grease pocket which traps dust, dirt and moisture and keeps them from having access to the bearing. During operation of the conveyor, the roller and outer race rotate with respect to the seal, and as operation continues, grease tends to seep between the edge 122 and the bearing unit outer race to collect in the chamber 136. The outwardly flaring configuration of the lip 120 tends to deflect foreign matter away from the outer race of the respective bearing units 38.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. A shaft seal for carrier roll units of the type including a roller mounted on a dead shaft and provided with a rolling bearing unit including inner and outer races interposed between the roller and the shaft adjacent either end of the latter, with the shaft being supported on a carrier frame and including a lubricant receiving bore and threaded end portions on which the seal is to be mounted, with the shaft end portions each including a port between the threading thereof and the adjacent bearing unit for supplying lubricant from the shaft bore to each seal, and with the roller including at either end thereof an annular sealing surface that is disposed substantially transversely of the shaft and in concentric relation thereto, said seal comprising:

a body member formed from a resiliently flexible lubric plastic material and adapted to be mounted on one of the shaft end portions adjacent the bearing unit disposed adjacent said one end portion to serve as a shaft seal therefor, said body member including:

a radially inward annular flange portion on one end thereof adapted to be positioned in alignment with the bearing unit inner race, a radially outward annular flange portion on said end thereof adapted to be positioned in alignment with the bearing unit outer race and terminating in a flexible annular lip portion shaped to define a knife edge, said body member other end being formed with a polygonal configuration adapted to be received in a complementary shaped seat in the carrier frame to support the shaft one end portion from the carrier frame, said body member being further formed to define a radial flange intermediate the ends thereof and proportioned radially of said body member for alignment with the roller sealing surface at the said one end portion of the shaft axially of said body member when the body member is mounted on the shaft one end portion, said body member being internally threaded for threaded application to the shaft one end portion, said radially inward flange portion being proportioned axially of said seal and relative to said radially outward flange portion to overlie the shaft port of the one end portion of the shaft and to space said inward flange portion short of the bearing unit inner race about .005 inch when said body member is threaded on the shaft one end portion to dispose said outward flange in contact with the bearing unit outer race without applying pressure thereagainst such that when said body member is positioned to dispose said radially inward flange portion in engagement with the bearing unit inner race, said edge of said lip portion of said radially outward flange portion is compressed against the outer race without exerting undue drag on the outer race, said radial flange being positioned with respect to said ends of said body member such that when said lip portion of said body member is in said compressed relation against the outer race, said radial flange is disposed in finger forming relation relative to the roller sealing surface at the said one end portion of the shaft, said radially inward flange portion having an internal diameter that exceeds the external diameter of said shaft and being formed with a lubricant passing opening therethrough whereby, when the body member is mounted on the shaft one end portion, lubricant from the shaft port underlying said radially inward flange has access to the space defined by same and said radially outward flange portion.

2. A carrier roller assembly for application to carrier roll frames, said assembly comprising:

a roller mounted on a shaft and provided with a rolling bearing unit including inner and outer races interposed between the roller and the shaft adjacent either end of the latter, with the shaft including a lubricant receiving bore and threaded end portions each including a port between the threading thereof and the adjacent bearing unit, and a seal applied to each shaft end portion in sealing relation to the respective bearing units, said seals each comprising:

a body member adapted to be mounted on the shaft adjacent the respective bearing units, said body member including:

a radially inward annular flange portion on one end thereof positioned in alignment with the adjacent bearing unit inner race, a radially outward annular flange portion on said end thereof positioned in alignment with the adjacent bearing unit outer race and terminating in a flexible annular lip portion, said radially inward flange portion being proportioned relative to said radially outward flange portion such that when said body member is positioned to dispose said radially inward flange portion in engagement with the bearing unit inner race, said lip portion of said radially outward flange portion is compressed against the outer race, said body member being internally threaded for threaded application to the respective shaft end portions and said body members being turned onto the respective shaft end portions to said position, said radially inward flange portion of each body member having an internal diameter that exceeds the external diameter of said shaft and being formed with a lubricant passing opening therethrough whereby lubricant has access to said radially outward flange portion, said body members each including a radial flange disposed for juxtaposition with respect to the roller side wall when said body members are in said positions to serve as fingers with respect to the roller, said roller being formed on the respective side walls thereof with an annular shoulder proportioned to be in closely spaced relation to the rims of the respective fingers in said positions of said body members.

3. The seal set forth in claim 2 wherein:

said body members axially outwardly of said radial flange thereof are formed with a polygonal configuration adapted to be received in a complementary shaped seat in the carrier frame.

References Cited

UNITED STATES PATENTS

| 1,793,346 | 2/1931 | Wego | 308—20 |
| 2,908,536 | 10/1959 | Dickey | 308—187.1 |
| 3,345,115 | 10/1967 | Olender | 308—20 |

FOREIGN PATENTS

| 1,242,724 | 8/1960 | France. |

EDWARD J. MICHAEL, Primary Examiner

U.S. Cl. X.R.

308—187.1

PO-1050
(5/69)

UNITED STATES PATENT OFFICE
CERTIFICATE OF CORRECTION

Patent No. 3,489,468            Dated January 13, 1970

Inventor(s) Richard D. Buck

It is certified that error appears in the above-identified patent and that said Letters Patent are hereby corrected as shown below:

Column 7, line 13, for "finger" read -- flinger --.
Column 8, line 23, for "fingers" read -- flingers --; same column 8, line 27, for "fingers" read -- flingers --.

SIGNED AND
SEALED
JUN 30 1970

(SEAL)
Attest:

Edward M. Fletcher, Jr.
Attesting Officer

WILLIAM E. SCHUYLER, JR.
Commissioner of Patents